(12) United States Patent
Higle

(10) Patent No.: US 10,533,619 B2
(45) Date of Patent: Jan. 14, 2020

(54) BRAKE DISK

(71) Applicant: Dr. Ing. h.c. F. Porsche Aktiengesellschaft, Stuttgart (DE)

(72) Inventor: Andreas Higle, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/039,790

(22) Filed: Jul. 19, 2018

(65) Prior Publication Data

US 2019/0024737 A1 Jan. 24, 2019

(30) Foreign Application Priority Data

Jul. 24, 2017 (DE) .................. 10 2017 116 681

(51) Int. Cl.
*F16D 65/12* (2006.01)
*F16D 65/02* (2006.01)

(52) U.S. Cl.
CPC .... *F16D 65/123* (2013.01); *F16D 2065/1316* (2013.01); *F16D 2065/1344* (2013.01); *F16D 2065/1368* (2013.01); *F16D 2065/1392* (2013.01)

(58) Field of Classification Search
CPC . F16D 65/12; F16D 65/123; F16D 2065/1316
USPC .................................................. 188/218 XL
See application file for complete search history.

(56) References Cited

U.S. PATENT DOCUMENTS

| | | |
|---|---|---|
| 3,661,235 A | 5/1972 | Harrison |
| 7,610,999 B2 | 11/2009 | Sadanowicz et al. |
| 9,249,848 B2 | 2/2016 | Kokott |
| 2005/0145452 A1* | 7/2005 | Yamamoto ............ F16D 65/12 188/218 XL |
| 2007/0235270 A1* | 10/2007 | Miskinis ............ F16D 65/0006 188/218 XL |

(Continued)

FOREIGN PATENT DOCUMENTS

| CN | 101855467 A | 10/2010 |
|---|---|---|
| CN | 103890437 A | 6/2014 |

(Continued)

OTHER PUBLICATIONS

German Search Report for German Application No. 10 2017 116 681.5, dated Apr. 10, 2018, with partial English translation—7 pages.

*Primary Examiner* — Vishal R Sahni
(74) *Attorney, Agent, or Firm* — RatnerPrestia

(57) ABSTRACT

A brake disk includes a friction ring, a brake disk hat and a securing ring. The friction ring has an inner side, on which a plurality of projections and intermediate spaces for connecting the friction ring to the brake disk hat are disposed. The brake disk hat has, on its outer side, intermediate spaces and projections which correspond with the projections and intermediate spaces of the friction ring and are shaped to engage in a positively locking manner into the projections and intermediate spaces of the friction ring, with the result that the friction ring is connected fixedly to the brake disk hat so as to rotate therewith. The securing ring secures the friction ring on the brake disk hat in the axial direction. The securing ring includes a number of spring elements which are spaced apart from one another in the circumferential direction of the securing ring.

12 Claims, 4 Drawing Sheets

(56) References Cited

U.S. PATENT DOCUMENTS

2013/0153344 A1    6/2013  Morio et al.

FOREIGN PATENT DOCUMENTS

| DE | 2013535 A1 | 10/1970 |
| DE | 19726674 A1 | 1/1998 |
| DE | 10324771 A1 | 12/2004 |
| DE | 60111429 T2 | 3/2006 |
| DE | 102010004856 A1 | 7/2011 |
| DE | 102012003159 A1 | 8/2013 |
| DE | 102012010875 A1 | 12/2013 |
| EP | 1759881 A2 | 3/2007 |

* cited by examiner

BRAKE DISK

CROSS-REFERENCE TO RELATED APPLICATION

This application claims priority to German Patent Application No. DE 10 2017 116 681.5 filed Jul. 24, 2017, which is incorporated by reference herein in its entirety.

FIELD OF THE INVENTION

The present invention relates to a brake disk, comprising a friction ring, a brake disk hat and a securing ring, the friction ring having an inner side, on which a plurality of projections and intermediate spaces for connecting the friction ring to the brake disk hat are configured, the brake disk hat having, on its outer side, intermediate spaces and projections which correspond with the projections and intermediate spaces of the friction ring and are shaped in such a way that they engage in a positively locking manner into the projections and intermediate spaces of the friction ring, with the result that the friction ring is connected fixedly to the brake disk hat so as to rotate with it, and the securing ring being set up to secure the friction ring on the brake disk hat in the axial direction.

BACKGROUND OF THE INVENTION

Different embodiments of brake disks which form a part of a brake system of a motor vehicle are known from the prior art. In this context, a distinction is to be made between single-piece brake disks, in which the friction ring and the brake disk hat are produced in one piece, for example from a steel material, and brake disks of the generic type which comprise a friction ring and a separately produced brake disk hat which are connected to one another fixedly in a suitable way so as to rotate together. Brake disks having a friction ring and a separate brake disk hat are as a rule used when the friction ring and the brake disk hat are produced from different materials.

DE 2 013 535 A1, which is incorporated by reference herein, has disclosed a brake disk which comprises a friction ring and a brake disk hat. In order to secure the friction ring in its target assembly position in the axial direction, the brake disk has a securing ring which is welded to the brake disk hat.

DE 10 2012 010 875 A1, which is incorporated by reference herein, discloses a brake disk having a friction ring and a wheel flange which from a functional viewpoint is comparable with a brake disk hat in the context of the present application. The friction ring is connected via a spline system fixedly to the wheel flange so as to rotate with it. In order to secure the friction ring on the wheel flange in the axial direction, a securing ring with securing arms is provided, which securing arms engage behind the wheel flange. This type of securing is appropriately suitable only for wheel flanges of a relatively flat design, but not for brake disk hats of a higher design.

SUMMARY OF THE INVENTION

In view of the foregoing challenges, described herein is are alternative way to secure a friction ring on the brake disk hat in the axial direction.

A brake disk according to aspects of the invention is distinguished by the fact that the securing ring comprises a number of spring elements which are spaced apart from one another in the circumferential direction of the securing ring, the spring elements and at least some of the projections of the brake disk hat being configured in such a way that, in a target assembly position of the securing ring, the spring elements interact with the projections which correspond with them in such a way that they retain the securing ring on the brake disk hat. The special configuration of at least some of the projections of the brake disk hat and of the securing ring with its spring elements achieves particularly secure retention of the friction ring on the brake disk hat in the axial direction. Moreover, the spring elements make a compensation of manufacturing tolerances possible.

It is proposed in one advantageous embodiment that the number of spring elements corresponds to the number of projections of the brake disk hat, and all the spring elements and all the projections are configured in such a way that, in a target assembly position of the securing ring, the spring elements interact with the projections which correspond with them in such a way that they retain the securing ring on the brake disk hat. In other words, in said embodiment, each of the projections of the brake disk hat is therefore assigned one of the spring elements of the securing ring, which spring element is connected to the relevant projection during the assembly of the securing ring.

The spring elements can preferably be spaced apart from one another in the circumferential direction of the securing ring in each case by way of an intermediate space.

It can be provided in one advantageous development that the intermediate spaces are configured and dimensioned in such a way that only every second projection of the brake disk hat in the circumferential direction is assigned one of the spring elements of the securing ring. It has been shown that secure retention of the securing ring on the brake disk hat can also be obtained in this embodiment, in order to secure the friction ring in its target assembly position in the axial direction, although only every second projection of the brake disk hat in the circumferential direction is assigned a spring element of the securing ring, which spring element interacts mechanically with the relevant projection.

There is the possibility in one preferred embodiment that the spring elements are arranged equidistantly with respect to one another in the circumferential direction of the securing ring. As a result, a uniform distribution of the retaining force of the securing ring in the circumferential direction is achieved.

In order to simplify the production of the securing ring, it is proposed in one particularly preferred embodiment that the spring elements are configured integrally with the securing ring.

The securing ring can preferably have an annular face which bears on the outside against the projections and intermediate spaces, of the friction ring and the brake disk hat which engage into one another in pairs. In particular, the annular face can be configured in such a way that it at least partially, preferably completely, covers the projections and intermediate spaces of the friction ring and the brake disk hat which engage into one another in pairs. In particular, the annular face of the securing ring makes a flush-mounted closure of the inner side of the friction ring possible.

It is proposed in one particularly preferred embodiment that each of the spring elements comprises a spring limb which, in a target assembly position, extends in the axial direction of the brake disk, an engagement opening being configured in each of the spring limbs, into which engagement opening in each case one projection of the brake disk hat is inserted. Particularly secure retention of the friction ring on the brake disk hat can be obtained by way of said engagement of the correspondingly shaped and dimensioned projections of the brake disk hat into the engagement openings of the spring limbs of the spring elements which are assigned in each case to them.

There is the possibility in one advantageous embodiment that each of the spring elements has a spring section which can be spread toward the outside in the radial direction, is shaped, in particular, in a bead-like manner, and extends between the annular face and the spring limb. Said spring section provides a corresponding mechanical prestress to the relevant spring element.

In order to secure the securing ring even more effectively against jumping out, it can be provided in one particularly advantageous embodiment that at least some of the projections of the brake disk hat have an undercut which is configured in such a way that, in the target assembly position, it engages behind an edge section of the engagement opening of one of the spring limbs. All of the projections of the brake disk hat can preferably have an undercut of this type.

The friction ring and the brake disk hat can preferably be produced from different materials. In this context, the use of the securing ring which is configured in the above-described way in interaction with the projections of the brake disk hat which correspond with it is particularly advantageous. In particular, the brake disk hat can be produced from a material which has a lower density and/or a lower thermal conductivity than the friction ring. For example, the friction ring can be produced from gray cast iron, whereas the brake disk hat can be produced from a light metal alloy, in particular from an aluminum alloy. The brake disk hat can be, in particular, a cast part or a forged part which can be mechanically finished, for example, by way of turning and/or milling.

BRIEF DESCRIPTION OF THE DRAWINGS

Further features and advantages of the present invention will become clear from the following description of preferred exemplary embodiments with reference to the appended drawings, in which.

DETAILED DESCRIPTION OF THE INVENTION

Figure 2:
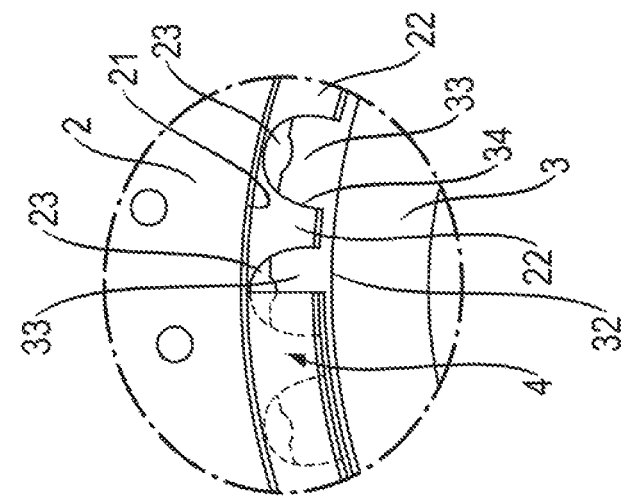
FIG. 2 shows a detail according to II in FIG. 1.
Figure 1:
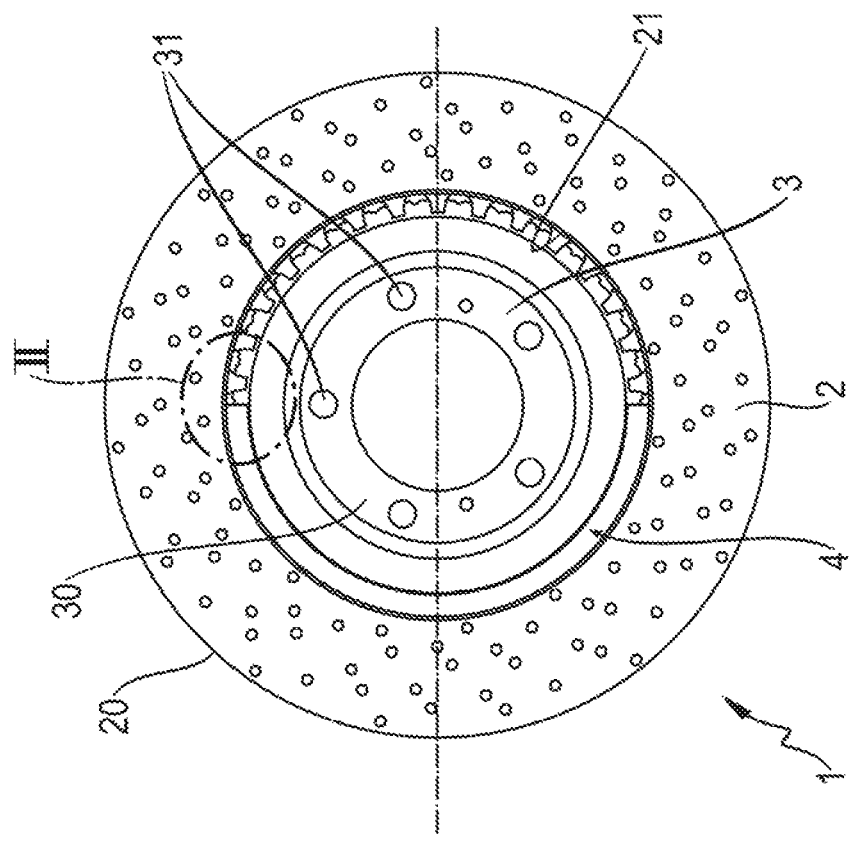
FIG. 1 shows a side view of a brake disk which is configured in accordance with one preferred exemplary embodiment of the invention.

With reference to FIGS. 1 and 2, a brake disk 1 which is configured in accordance with one exemplary embodiment of the present invention comprises a friction ring 2 which has a circular outer side 20 and an inner side 21, and a separately produced brake disk hat 3. The friction ring 2 and the brake disk hat 3 are arranged concentrically with respect to one another, the friction ring 2 being connected fixedly to the brake disk hat 3 so as to rotate with it. Furthermore, the brake disk 1 has a securing ring 4 which has been illustrated merely partially in FIG. 1 and FIG. 2 (only half of it being illustrated in FIG. 1) and which serves the purpose of securing the friction ring 2 on the brake disk hat 3 in the axial direction (that is to say, perpendicularly with respect to the plane of the drawing in FIG. 1).

The friction ring 2 and the brake disk hat 3 can be produced, in particular, from different materials. For example, the brake disk hat 3 can be produced from a material which has a lower density and/or a lower thermal conductivity than the material from which the friction ring 2 is produced. There is the possibility, for example, that the friction ring 2 is produced from gray cast iron, whereas the brake disk hat 3 is produced from a light metal alloy, in particular from an aluminum alloy. The brake disk hat 3 can be, in particular, a cast part or a forged part which can be mechanically finished, for example, by way of turning and/or milling.

As can be seen, in particular, in the detailed view according to FIG. 2, the inner side 21 of the friction ring 2 has a plurality of projections 22 which extend radially inward in the direction of a center point of the brake disk 1. An intermediate space 23 is configured in each case between two adjacent projections 22 which extend in the direction of the center point of the brake disk 1. The brake disk hat 3 which is connected to the friction ring 2 has an annular inner region 30, within which a plurality of circular apertures 31 are configured. A fastening screw can be guided in each case through each of said circular apertures 31, in order for it to be possible for the brake disk 1 to be fastened to a wheel hub (not shown explicitly here) of a wheel.

Furthermore, the brake disk hat 3 has an annular wall 32 which comprises a plurality of projections 33 which extend in the circumferential direction and are spaced apart from one another in each case by way of an intermediate space 34. The projections 33 which are preferably arranged equidistantly with respect to one another in the circumferential direction protrude in the radial direction beyond the annular wall 32 of the brake disk hat 3 and therefore form both an axial and a radial closure of the brake disk hat 3.

The projections 33 and intermediate spaces 34 of the brake disk hat 3 which alternate in the circumferential direction are of complementary configuration with respect to the projections 22 and intermediate spaces 23 of the friction ring 2 which alternate in the circumferential direction. This means that, during the assembly of the friction ring 2 on the brake disk hat 3, the projections 22 of the friction ring 2 engage into the intermediate spaces 34 of the brake disk hat 3 which correspond with them and, conversely, the projections 33 of the brake disk hat 3 engage into the intermediate spaces 23 of the friction ring 2 which correspond with them. A positively locking connection of the friction ring 2 to the brake disk hat 3 in the manner of a spline system is obtained as a result. The projections 22 of the friction ring 2 which engage into the intermediate spaces 34 of the brake disk hat 3 and the projections 33 of the brake disk hat 3 which engage into the intermediate spaces 23 of the friction ring 2 therefore produce a fixed connection of the friction ring 2 to the brake disk hat 3 so as to rotate together, which connection makes the transmission of torque possible.

Figure 4:
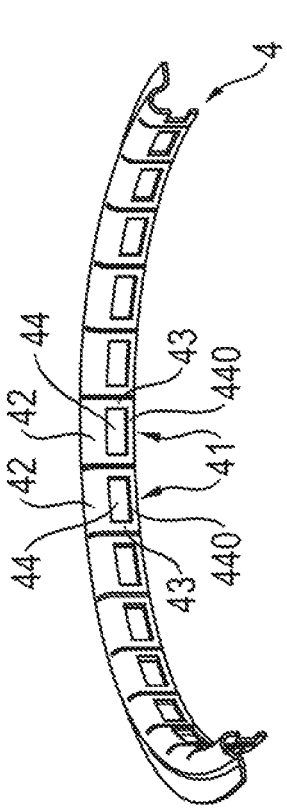
FIG. 4 shows a section through the securing ring according to FIG. 3.
Figure 3:
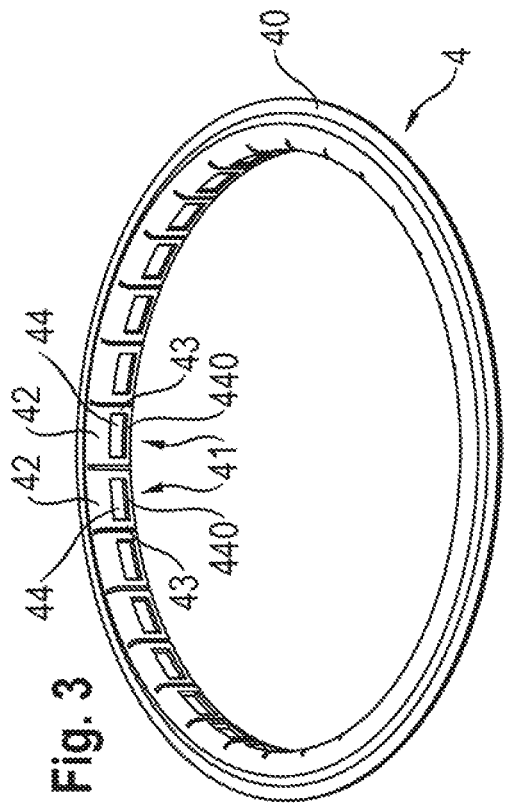
FIG. 3 shows a perspective view of a securing ring for securing a friction ring of the brake disk on a brake disk hat, the securing ring being configured in accordance with a first design variant.

In order to secure said above-described arrangement of the friction ring 2 and the brake disk hat 3 in the axial direction with the projections 22, 33 and intermediate spaces 23, 34 which engage into one another in pairs, the securing ring 4 which has already been mentioned briefly above is provided. A first design variant of said securing ring 4 is shown in FIG. 3 and FIG. 4.

Figure 5:
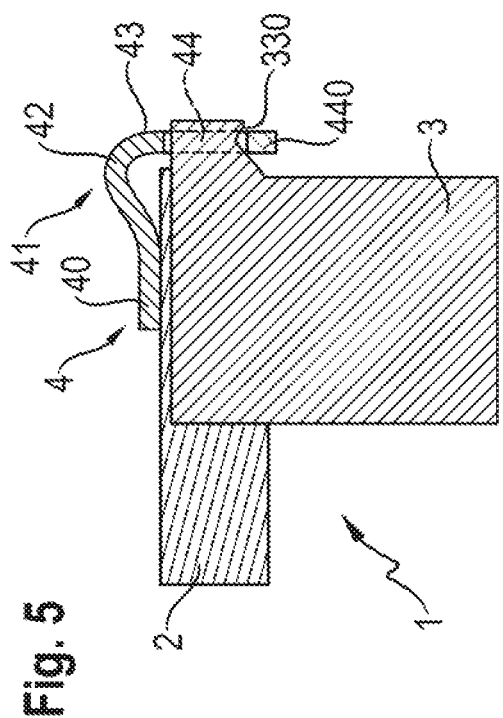
FIG. 5 shows a diagrammatically simplified sectional view which illustrates details of the fastening of the securing ring to the brake disk hat.

The securing ring 4 has an annular face 40 which, after the assembly of the securing ring 4, bears on the outside against the projections 22, 33 and intermediate spaces 23, 34 of the friction ring 2 and the brake disk hat 3 which engage into one another in pairs, and covers them. Furthermore, the securing ring 4 has a number of spring elements 41 which corresponds to the number of projections 33 of the brake disk hat 3, which spring elements 41 are configured integrally with the securing ring 4. Each of the spring elements 41 comprises a spring section 42 which is shaped in a bead-like manner in the present case and adjoins the annular face 40, and which can be spread toward the outside during the assembly of the securing ring 4 (see FIG. 6). Furthermore, each of the spring elements 41 comprises a spring limb 43 which, in a target assembly position, extends in the axial direction of the brake disk 1 (see FIG. 5). An engagement opening 44 is configured in each of the spring limbs 43. Said engagement openings 44 are shaped in such a way that, during the assembly, in each case one of the projections 33 of the brake disk hat 3 can be inserted into the engagement opening 44 of one of the spring limbs 43, in order to secure the friction ring 2 in its target assembly position on the brake disk hat 3 in the axial direction as a result.

Figure 6:
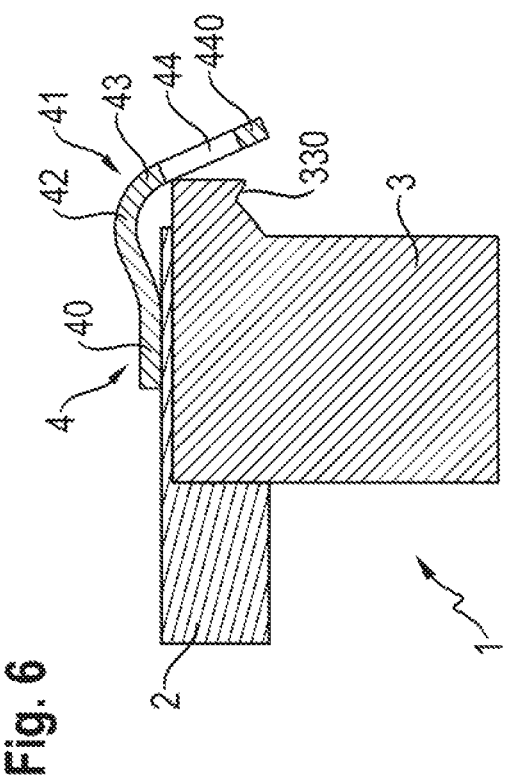
FIG. 6 shows a diagrammatically simplified sectional view which illustrates details of the joining operation of the securing ring to the brake disk hat.

The joining operation of one of the spring elements 41 is shown in FIG. 6. The length of each spring limb 43 is selected in such a way that the relevant spring limb 43 can be joined via one of the projections 33 of the brake disk hat 3. During the assembly, the spring limb 43 and therefore also the spring section 42 are first of all spread toward the outside. Subsequently, the spring limb 43 is guided in such a way that one of the projections 33 of the brake disk hat 3 engage into the engagement opening 44 of the spring limb 43. To this end, each of the spring elements 41 is capable of generating a mechanical prestress, with the result that secure retention of the securing ring 4 on the brake disk hat 3 is achieved. Furthermore, the spring elements 41 make a compensation of manufacturing tolerances possible. One advantage of the securing ring 4 which is configured in the above-described way consists in that the spring function of the spring elements 41 is provided less via the elasticity of the material, from which the securing ring 4 with the spring elements 41 is produced, but rather via the geometry of the spring elements 41, in particular by way of the length of the spring limbs 43. This leads to a relief of the material, from which the securing ring 4 with the spring elements 41 is produced, in particular in relation to its yield strength and the transition into a plastic range.

In order to prevent the spring elements 41 from jumping out of the projections 33 of the brake disk hat 3 and therefore to avoid it being possible for the securing ring 4 to be released unintentionally from the brake disk hat 3, each of the projections 33 preferably has in each case one undercut 330 in a lower region, which undercut 330 is shaped in such a way that, in the target assembly position, it engages behind an inner edge section 440 of the engagement opening 44.

Figure 7:
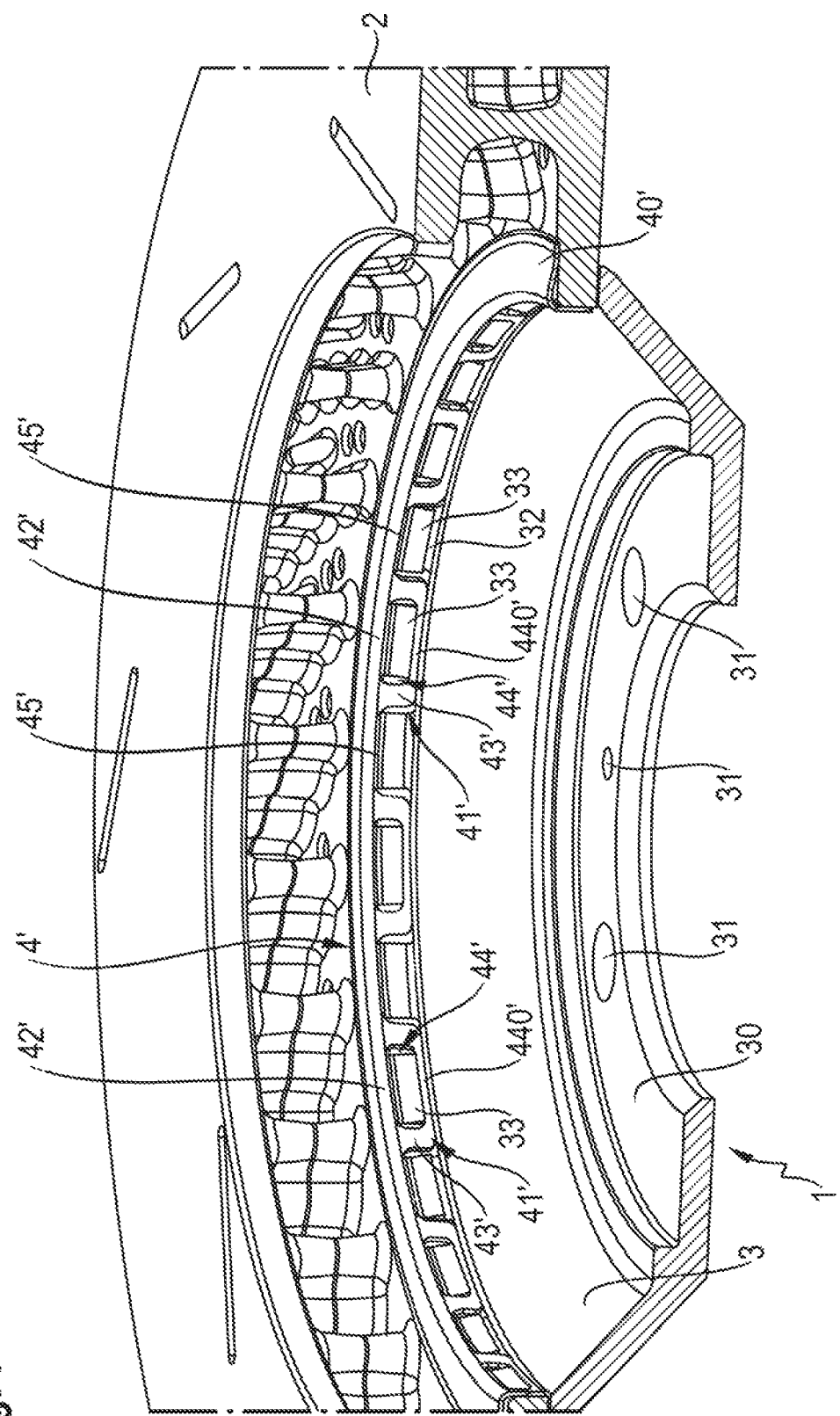
FIG. 7 shows a section through a brake disk, the securing ring being configured in accordance with a second design variant.
Figure 8:
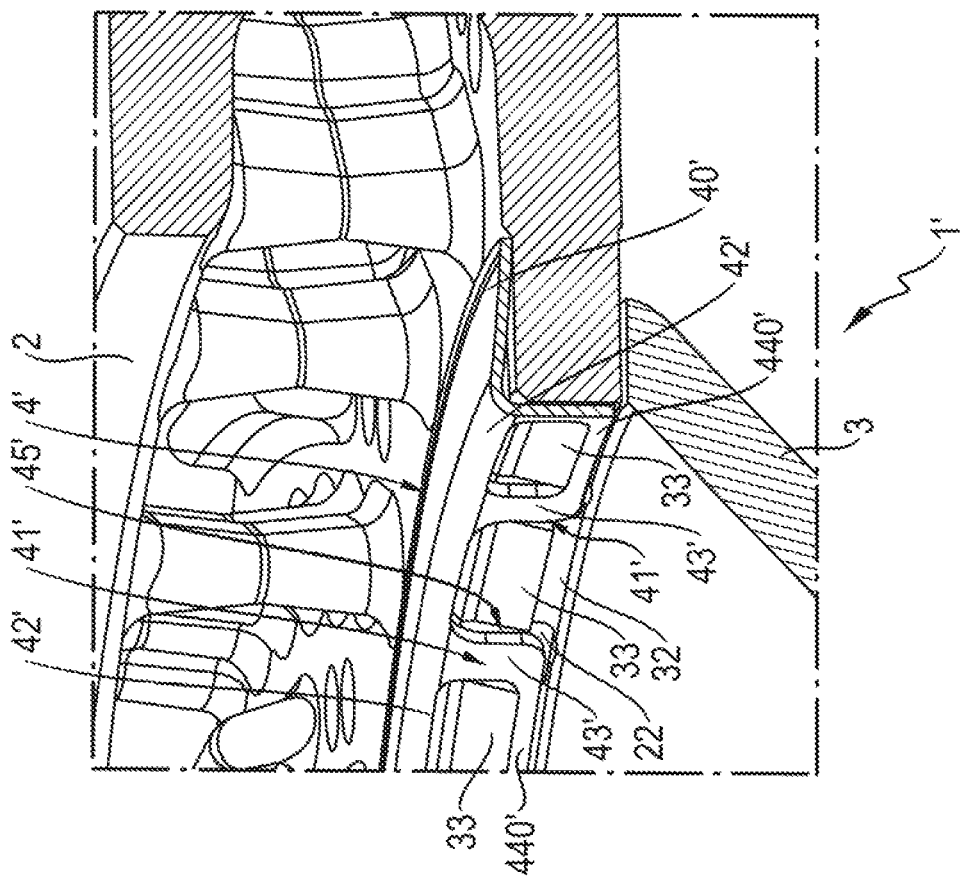
FIG. 8 shows a detail of the brake disk according to FIG. 7, which detail illustrates the joining operation of the securing ring.
Figure 9:
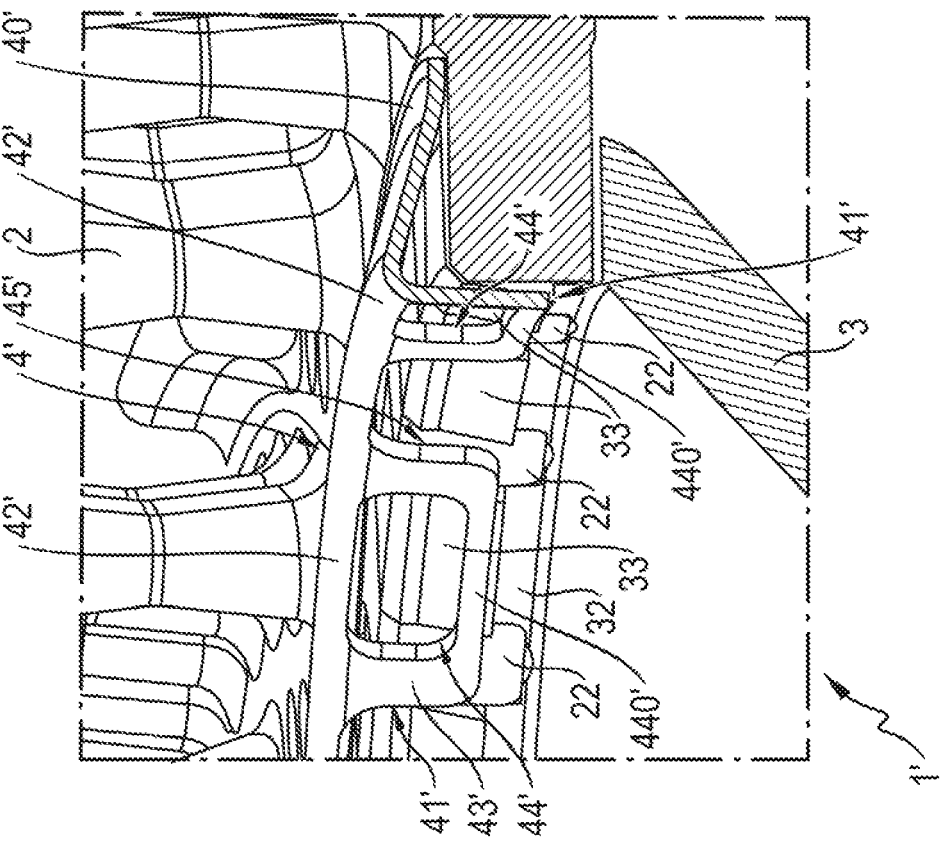
FIG. 9 shows a detail of the brake disk according to FIG. 7, the securing ring being situated in its target assembly position.

With reference to FIGS. 7 to 9, a further exemplary embodiment of a brake disk 1' is to be described in greater detail in the following text. The fundamental construction of the friction ring 2 and the brake disk hat 3 with the projections 22, 33 and intermediate spaces 23, 34 which engage into one another in pairs corresponds to that of the exemplary embodiment which is described above with reference to FIGS. 1 to 6, with the result that no renewed statements in this regard are required to this extent. Said brake disk 1' differs from the first exemplary embodiment by way of the securing ring 4' of structurally somewhat different design. In the first design variant, the securing ring 4 is configured in such a way that each of the spring elements 41 is assigned a projection 33 of the brake disk hat 3, and the spring elements 41 adjoin one another directly. In contrast, the securing ring 4' in the second design variant is configured in such a way that the spring elements 41' are spaced apart from one another in the circumferential direction of the securing ring 4' in each case by way of an intermediate space 45', with the result that (as viewed in the circumferential direction) only every second projection 33 of the brake disk hat 3 is assigned one of the spring elements 41'. In other words, this means that the extents of the intermediate spaces 45' between adjacent spring elements 41' in the circumferential direction are selected in such a way that, as viewed in the circumferential direction, only every second projection 33 of the brake disk hat 3 interacts with a spring element 41' of the securing ring 4' and engages into its engagement opening 44'. Although the securing ring 4' is fastened only to every second projection 33 of the brake disk hat 3, secure retention of the securing ring 4' on the brake disk hat 3 is nevertheless ensured.

What is claimed is:

1. A brake disk comprising:
    a friction ring, a brake disk hat and a securing ring each extending about a common axis of rotation, the securing ring being configured to secure the friction ring on the brake disk hat in an axial direction, which axial direction is parallel to the axis of rotation,
    the friction ring having an inner side, on which a plurality of projections and intermediate spaces for connecting the friction ring to the brake disk hat are disposed,
    the brake disk hat having an outer side on which intermediate spaces and projections, which correspond with the projections and intermediate spaces of the friction ring, and the intermediate spaces and projections of the brake disk hat extend in the axial direction and are shaped in such a way that they engage in a positively locking manner into the projections and intermediate spaces of the friction ring, with the result that the friction ring is connected fixedly to the brake disk hat so as to rotate with the brake disk hat,
    wherein the securing ring comprises a number of spring elements extending in the axial direction which are spaced apart from one another in a circumferential direction of the securing ring, the spring elements and a plurality of the projections of the brake disk hat being configured in such a way that, in the process of attaching the securing ring in the axial direction over corresponding projections of the brake disk hat, the spring elements of the securing ring are configured to flex over and then connect to the corresponding projections of the brake disk hat to retain the securing ring on the brake disk hat.

2. The brake disk as claimed in claim 1, wherein the number of spring elements corresponds to the number of projections of the brake disk hat, and all of the spring elements and all of the projections of the brake disk hat are configured in such a way that, in the process of attaching the securing ring, the spring elements of the securing ring interact with the corresponding projections of the brake disk hat to retain the securing ring on the brake disk hat.

3. The brake disk as claimed in claim 1, wherein adjacent spring elements are spaced apart from one another in the circumferential direction of the securing ring, in each case, by way of an intermediate space of the securing ring.

4. The brake disk as claimed in claim 3, wherein the intermediate spaces of the securing ring are configured and dimensioned in such a way that only every second projection of the brake disk hat in the circumferential direction is assigned one of the spring elements of the securing ring.

5. The brake disk as claimed in claim 1, wherein the spring elements are arranged equidistantly with respect to one another in the circumferential direction of the securing ring.

6. The brake disk as claimed in claim 1, wherein the spring elements are integral with the securing ring.

7. The brake disk as claimed in claim 1, wherein the securing ring has an annular face which bears on an outside against the projections and intermediate spaces of the friction ring and the brake disk hat which engage into one another in pairs.

8. The brake disk as claimed in claim 7,
wherein each of the spring elements comprises a spring limb which, in the process of attaching the securing ring, extends in the axial direction of the brake disk,
an engagement opening being disposed in each of the spring limbs, into which engagement opening, in each case, one projection of the brake disk hat is inserted.

9. The brake disk as claimed in claim 8, wherein each of the spring elements has a spring section, which is configured to be spread toward the outside in a radial direction, and the spring section is shaped in a bead-like manner and extends between the annular face and the spring limb.

10. The brake disk as claimed in claim 9, wherein the plurality of the projections of the brake disk hat have an undercut which is configured in such a way that, in the process of assembling the securing ring, the undercut engages behind an edge section of the engagement opening of one of the spring limbs.

11. The brake disk as claimed in claim 10, wherein each of the plurality of the projections of the brake disk hat has a chamfered leading surface and a trailing surface, wherein the undercut intersects the trailing surface.

12. The brake disk as claimed in claim 10, wherein the plurality of the projections of the brake disk hat are positioned on a revolved surface of the brake disk hat that faces the common axis.

* * * * *